United States Patent [19]

Schwartz et al.

[11] Patent Number: 4,579,924

[45] Date of Patent: Apr. 1, 1986

[54] FLUOROCHEMICAL COPOLYMERS AND OVENABLE PAPERBOARD AND TEXTILE FIBERS TREATED THEREWITH

[75] Inventors: Craig A. Schwartz, Oakdale; Michael M. Lynn, White Bear Lake, both of Minn.

[73] Assignee: Minnesota Mining and Manufacturing Company, St. Paul, Minn.

[21] Appl. No.: 720,557

[22] Filed: Apr. 5, 1985

Related U.S. Application Data

[62] Division of Ser. No. 433,974, Oct. 13, 1985, Pat. No. 4,529,658.

[51] Int. Cl.$^4$ ............................................. C08F 220/24
[52] U.S. Cl. .................................... 526/243; 526/245; 526/246; 428/421; 428/392
[58] Field of Search ...................... 526/243, 245, 246

[56] References Cited

U.S. PATENT DOCUMENTS

| | | | |
|---|---|---|---|
| 3,625,929 | 12/1971 | Stump | 526/246 |
| 4,127,711 | 11/1978 | Lore | 526/245 |
| 4,504,642 | 3/1985 | Ohmori | 526/246 |

*Primary Examiner*—Paul R. Michl
*Attorney, Agent, or Firm*—Donald M. Sell; James A. Smith; David R. Cleveland

[57] ABSTRACT

Fluorochemical copolymers, useful as wet-end papermaking additives which impart oil and water repellency and food stain resistance to ovenable paperboard under food cooking conditions, and as a treatment for imparting oil and water repellency to textile fibers. The fluorochemical copolymers are derived (by weight) from about 60 to 80% fluorochemical acrylate, 1 to 30% alkyl or alkoxyalkyl acrylate or methacrylate, 2 to 15% glycidyl acrylate or methacrylate, 1 to 6% of certain cationic acrylates or methacrylates, and 0 to 20% vinylidene chloride.

14 Claims, No Drawings

FLUOROCHEMICAL COPOLYMERS AND OVENABLE PAPERBOARD AND TEXTILE FIBERS TREATED THEREWITH

This is a division of application Ser. No. 433,974 filed Oct. 13, 1985, now U.S. Pat. No. 4,529,658.

TECHNICAL FIELD

This invention relates to fluorochemical copolymers which impart high temperature oil and water repellency and food stain resistance to cellulosic materials. This invention also relates to fluorochemical copolymers which impart oil and water repellency to textile fibers. Also, this invention relates to internal ("wet-end") beater additives useful in the manufacture of ovenable paperboard. In addition, this invention relates to fluorochemical copolymer-treated cellulosic materials and shaped articles made therefrom (e.g., ovenable paperboard cartons and trays), copolymer-treated textile fibers (e.g., carpet fibers), and processes for making the same.

BACKGROUND ART

Various fluorochemical wet pick-up and internal sizing agents for paper treatment are described, for example, in Rengel and Young, "Internal Sizing of Paper and Paperboard", Tappi monograph series number 33, pp. 170-189 (1971), Colbert, "Fluorochemicals-Fluid Repellency for Non-woven Substrates", *Tappi, The Journal of the Technical Association of the Pulp and Paper Industry*, 59, 9, (September, 1976), Banks, Ed., *Organofluorine Chemicals and their Industrial Applications*, pp. 231-234 (1979), and Schwartz, "Oil Resistance Utilizing Fluorochemicals", Tappi conference preprint, 1980 Sizing Short Course, Atlanta, Ga. Several fluorochemical phosphates have been approved by the U.S. Food and Drug Administration for use on paperboard in direct contact with food for human consumption. These fluorochemical phosphates can be used as wet pick-up or as internal treatments. They primarily provide oil resistance, and are used on paper plates, bags for bakery goods, cartons and trays for oil fried foods (e.g., French fries), and in bags and cartons for pet foods.

The advent in recent years of the microwave oven has created a need for non-metallic containers for cooking or food-warming which have resistance to both oily and aqueous foods at oven temperatures, since metallic containers (e.g., aluminum trays) do not efficiently cook foods in microwave ovens and may promote electrical arcing if the metallic container walls approach or touch the walls of the microwave oven. A suitable non-metallic food container should also withstand freezing temperatures and conventional oven temperatures because foods solid in such containers will often be frozen and will be cooked in both microwave and conventional ovens. Cooking times for foods stored in such containers usually range from a few minutes to sixty minutes or more, and cooking temperatures usually range from about 95° C. to 240° C. or higher.

Existing commercially available fluorochemical phosphate sizing treatments do not provide sufficient high temperature water repellency to ovenable paperboard food trays exposed to cooking conditions for extended periods of time. Food packagers have had to employ other container materials or constructions to obtain adequate ovenability. For example, former food trays can be made entirely from plastics such as polyethylene terephthalate. Also laminated, stamped food trays can be made from a layer of conventional paperboard coated on the food side with a thin (0.25 to 0.33 millimeters) film of extruded polyester. Food containers made entirely from plastic are relatively expensive, consume scarce petroleum resources, and lose rigidly at elevated temperatures. Food containers made from laminated paperboard and polyester sheets can become stained with oil on the unprotected outside surface (e.g., during food filling operations), are prone to rupture of the container at corners during tray-forming operations (due in part to differences in moisture content within the paperboard sheet), are susceptible to delamination when foods are heated to very high temperatures (e.g., when bacon or sausage are heated in microwave or conventional ovens), and are relatively expensive, requiring about 110 grams of polyester resin per kilogram of paperboard. In addition, scrap or waste paperboard from tray forming or other operations performed on paperboard/polyester laminate is not repulpable, and this scrap is sometimes as much as 25 percent of the total paperboard/polyester laminate consumed.

DISCLOSURE OF INVENTION

The present invention provides, in one aspect, fluorochemical copolymers useful for imparting oil and water repellency under food cooking conditions to cellulosic materials, or oil and water repellency to textile fibers, said copolymers comprising (by weight) about:

(a) 60 to 80% of polymer chain repeat units derived from fluoroacrylate monomer(s) of the formula:

$$(R_f)_p QOCOCH=CH_2 \qquad I$$

wherein $R_f$ is a fluoroaliphatic radical-containing group having 3 to 20 carbon atoms, Q is a polyvalent organic connecting group, and p is 1 or 2;

(b) 1 to 30% of polymer chain repeat units derived from alkyl or alkoxyalkyl acrylate or methacrylate monomer(s) of the formula:

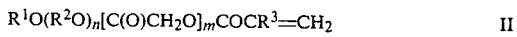
$$R^1O(R^2O)_n[C(O)CH_2O]_m COCR^3=CH_2 \qquad II$$

wherein $R^1$ is a $C_{1-20}$ alkyl or cycloalkyl group, $R^2$ is a $C_{1-6}$ alkylene group, each $R^2$ group can be the same as or different from other $R^2$ groups, n is zero to about 10 with the proviso that when n is zero $R^1$ is a $C_{1-16}$ alkyl or cycloalkyl group, m is zero or 1, and $R^3$ is H or methyl;

(c) 2 to 15% of polymer chain repeat units derived from monomer(s) of the formula:

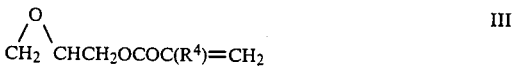

$$\underset{CH_2}{\overset{O}{\diagup\!\!\!\diagdown}} CHCH_2OCOC(R^4)=CH_2 \qquad III$$

wherein $R^4$ is H or methyl;

(d) 1 to 6% of polymer chain repeat units derived from cationic monomer(s) of the formula:

$$CH_2=C(R^5)ZY^+X^- \qquad IV$$

wherein $R^5$ is H or methyl, Z is a divalent electron-withdrawing group which activates free-ractical polymerization, $Y^+$ is a monovalent cationogenic group, and $X^-$ is a water solubilizing anion; and (e) 0 to 20% of polymer chain repeat units derived from vinylidene chloride; with the proviso that the weight percent of carbon-bonded fluorine in said copolymers is at least about 15%.

The present invention also provides cellulosic materials and textile fibers which have been treated with said fluorochemical copolymers, shaped articles (e.g., food trays) made from such treated cellulosic materials, and articles (e.g., carpet) made from such treated fibers.

In addition, the present invention provides a process for imparting high temperature oil and water repellency and food stain resistance to cellulosic materials, comprising the step of applying to said materials at least one of said fluorochemical copolymers. Also, the present invention provides a process for imparting oil and water repellency to textile fibers, comprising the step of applying to said fibers at least one of said fluorochemical copolymers.

DETAILED DESCRIPTION

The copolymers of the present invention will be construed to include not only copolymers actually prepared from the above-named monomers, but also copolymers which were not actually prepared from such monomers but whose chemical structures are such that the copolymer could have been prepared from such monomers if desired.

The $R_f$ substituent of the monomers of Formula I is a monovalent, fluorinated, aliphatic, preferably saturated, organic radical having at least three carbon atoms and as many as twenty carbon atoms. The skeletal chain of $R_f$ can be straight, branched, or, if sufficiently large, cyclic, and can include catenary divalent oxygen atoms or trivalent nitrogen atoms bonded only to carbon atoms. Preferably, $R_f$ is fully fluorinated, but carbon-bonded hydrogen or chlorine atoms can be present as substituents on the skeletal chain of $R_f$, provided that not more than one atom of either hydrogen or chlorine is present for every two carbon atoms in the skeletal chain of $R_f$, and further provided that $R_f$ contains at least a terminal perfluoromethyl group. While $R_f$ radicals containing a large number of carbon atoms will function adequately, radicals containing not more than about 14 carbon atoms are preferred since larger radicals usually represent a less efficient utilization of fluorine than is possible with smaller radicals. Preferably, $R_f$ has an average of about 6 to 10 carbon atoms.

Q is an organic polyvalent (e.g., divalent) acyclic or alicyclic radical of 1 to about 12 carbon atoms, or a polyvalent (e.g., divalent) aromatic radical of about 3 to 12 carbon atoms. Q can contain, for example, skeletal nitrogen, oxygen, or sulfur atoms, or carbonylimino, sulfonylimino, imino, or carbonyl radicals. Q is unsubstituted or substituted by halogen atoms, hydroxyl, alkyl, or aryl radicals, and preferably is free from aliphatic unsaturation. Suitable Q radicals include —$CH_2$—, —$C_2H_4$—, —$C_4H_8$—, —$C_6H_4$—, —$C_6H_3$<, —$CH_2C_6H_4CH_2$—, —$C_2H_4SC_2H_4$—, —$C_2H_4OC_4H_8$—, —$CH_2OC_2H_4$—, —$SO_2N(R^6)C_2H_4$—, —$CON(R^6)C_2H_4$—, —$C_3H_6CON(R^6)C_2H_4$—, —$C_2H_4N(R^6)C_2H_4$—, —$COOCH_2C(CH_3)_2CH_2$—, —$SO_2N(R^6)CH_2CH(CH_3)$—, and —$C_2H_4SO_2N(R^6)C_4H_8$—, where $R^6$ is H or a $C_{1-4}$ alkyl radical. Preferably, Q is —$CH_2$—, —$C_2H_4$—, or —$SO_2N(R^6)C_2H_4$—.

Preferably, the monomers of Formula I contain at least about 30 weight percent fluorine and more preferably about 40 to 60 weight percent fluorine. Preferably, about 65 to 75 weight percent of the monomers of Formula I are used to form the copolymers of this invention.

Representative monomers of Formula I include
$C_8F_{17}SO_2N(CH_3)CH_2CH_2OCOCH=CH_2$,
$C_6F_{13}C_2H_4SC_2H_4OCOCH=CH_2$,
$C_2F_5C_6F_{10}CH_2OCOCH=CH_2$,
$C_7F_{15}CH_2OCOCH=CH_2$, $C_7F_{15}CON(CH_3)C_2H_4OCOCH=CH_2$, $(CF_3)_2CF(CF_2)_6CH_2CH(OH)CH_2OCOCH=CH_2$, $(CF_3)_2CFOC_2F_4C_2H_4OCOCH=CH_2$, $C_8F_{17}C_2H_4SO_2N(C_3H_7)C_2H_4OCOCH=CH_2$, $C_7F_{15}C_2H_4CONHC_4H_8OCOCH=CH_2$,

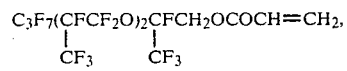

$C_8F_{17}SO_2N(C_2H_5)C_4H_8OCOCH=CH_2$,
$(C_3F_7)_2C_6H_3SO_2N(CH_3)C_2H_4OCOCH=CH_2$,

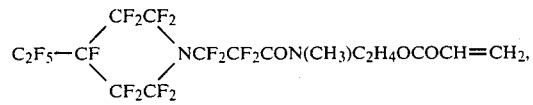

and $C_8F_{17}CF=CHCH_2N(CH_3)C_2H_4OCOCH=CH_2$.

In the monomer of Formula II, $R^1$ is straight chain, branched, or cyclic, e.g., $CH_3(CH_2)_8CH_2$—, $CH_3(CH_2)_3$—, $CH_3(CH_2)_4CH(C_2H_5)CH_2$—, or $C_6H_{11}$—. $R^1$ preferably is a $C_{1-4}$ alkyl radical, and most preferably is $CH_3$— or $CH_3CH_2$—. $R^2$ is straight chain or branched, e.g., —$C_2H_4$—, —$(CH_2)_4$—, or —$CH_2CH(CH_3)$—. $R^2$ *preferably is a* $C_{1-4}$ alkylene radical, and most preferably is —$C_2H_4$—. Preferably n is 1, and preferably m is zero. Also, $R^3$ preferably is H. Preferably, about 10 to 20 weight percent of the monomers of Formula II are used to form the copolymers of this invention.

Representative monomers of Formula II include the acrylate monomers $CH_3OCOCH=CH_2$, $C_2H_5OCOCH=CH_2$, $C_4H_9OCOCH=CH_2$, $CH_3(CH_2)_9CH_2OCOCH=CH_2$, $CH_3(CH_2)_4CH(C_2H_5)CH_2OCOCH=CH_2$, $CH_3OCH_2OCOCH=CH_2$, $CH_3OC_2H_4OCOCH=CH_2$, $CH_3OC_4H_8OCOCH=CH_2$, $C_2H_5OC_2H_4OCOCH=CH_2$, $C_2H_5OC_3H_6OCOCH=CH_2$, $C_2H_5OC_2H_4OCOCH=CH_2$, $C_2H_5O(C_2H_4O)_2COCH=CH_2$, $C_2H_5OC_2H_4OC(O)CH_2OCOCH=CH_2$, $C_2H_5O(C_2H_4O)_2C(O)CH_2OCOCH=CH_2$, $C_4H_9O(C_2H_4O)_2COCH=CH_2$, $C_2H_5OCH_2CH(CH_3)OCOCH=CH_2$, and $C_2H_5O(CH_2CH(CH_3))_2OCOCH=CH_2$, as well as the methacrylate monomers corresponding thereto.

The monomers of Formula II can be prepared using conventional methods. Monomers in which n and m are zero can be prepared, for example, by reacting an alkanol (e.g., ethanol) with acryloyl chloride, methacryloyl chloride, acrylic acid, or methacrylic acid to form an ester. Monomers in which n is 1 or more and m is zero can be prepared, for example, by reacting an alkanol with an alkylene oxide (e.g., ethylene oxide), and reacting the resulting adduct with the above-named acid chlorides or acids. Monomers in which m is 1 can be prepared, for example, by reacting an alkanol (for monomers where n is zero) or the above-described adduct of alkanol and alkylene oxide (for monomers where n is 1 or more) with chloroacetic acid, and combining the product of the latter reaction with the above-named acid chlorides or acids. The above-described syntheses are generally carried out in the presence of suitable catalysts, e.g. an acid catalyst for esterification with acrylic or methacrylic acid or an amine catalyst for esterification with acryloyl or methacryloyl chloride. For any of the above-described syntheses, the final product should be purified (e.g., by distillation, acid wash, or base wash) to remove residual acid, acid chloride, catalysts, and other impurities or by-products.

In the monomers of Formula III, $R^4$ preferably is methyl. Preferably, about 3 to 10 weight percent of the monomers of Formula III are used to form the copolymers of this invention.

In the monomer of Formula IV, the Z group has a carbonyl or aromatic group or an oxygen or sulfur atom bonded directly to the vinylidene group of the monomer. The Z group can be, for example, $-COO(CH_2)_p-$, $-CO(CH_2)_p-$, $-CONH(CH_2)_p-$, $-OCO(CH_2)_p-$, $-O(CH_2)_p-$, $-S(CH_2)_p-$, $-C_6H_4-$, or $-C_6H_4(CH_2)_p-$, where p is 1 to 10. The polymethylene moiety $-(CH_2)_p-$ and the aromatic moiety $-C_6H_4-$ in such structures can be substituted with substituent groups or atoms which do not interfere with free-radical polymerization, such as alkyl, aryl, or hydroxyl groups or halogen atoms. The $R^5$ group preferably is $CH_3-$. The Z group preferably is selected from $-COOCH_2CH(OH)CH_2-$, $-COO(CH_2)_k-$, or $-CONH(CH_2)_k-$, where k is 2 to 6. Useful $Y^+$ groups include (a) the pyridinium ion

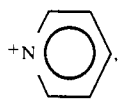

(b) the ion $N^+(R^7)_3$ where each $R^7$ independently is H or a $C_{1-4}$ alkyl group, or where any two of $R^7$ combine to form an alkylene group having 4 to 5 chain carbon atoms, or any two of $R^7$ are $-(CH_2)_2-$ and combine with an oxygen atom to form the moiety $-(CH_2)_2O(CH_2)_2-$, (c) phosphonium ions, and (d) sulfonium ions. Preferably, $Y^+$ is $N^+(R^8)_3$ where each $R^8$ independently is a $C_{1-4}$ alkyl group. The anion $X^-$ is a matter of choice, and ordinarily is selected based upon the method of synthesis of the cationic monomer. $X^-$ preferably is selected from halide ions such as $Cl^-$, $Br^-$, $I^-$, and alkyl sulfate ions such as $CH_3OSO_3^-$. Preferably, about 2 to 4 weight percent of the monomers of Formula IV are used to form the copolymers of this invention.

Representative monomers of Formula IV include
$CH_2=C(CH_3)COOC_2H_4N^+(CH_3)_3$ $Cl^-$,
$CH_2=CHCOOC_2H_4N^+(CH_3)_3$ $Cl^-$,
$CH_2=C(CH_3)COOC_2H_4N^+(CH_3)_3$ $^-OSO_3CH_3$,
$CH_2=C(CH_3)COOCH_2CH(OH)CH_2N^+(CH_3)_3$ $Cl^-$,
$CH_2=C(CH_3)CONHC_3H_6N^+(CH_3)_3$ $Cl^-$,
$CH_2=C(CH_3)COOC_2H_4N^+(C_2H_5)_2H$ $Cl^-$, $$CH_2=C(CH_3)COOC_2H_4\overset{\underset{\mid}{CH_3}}{N^+}(C_2H_5)_2\ I^-,$$

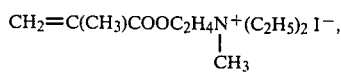

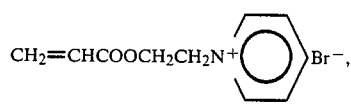

and $CH_2=CHC_6H_4CH_2N^+(CH_3)_3\ Cl^-$.

The performance of paperboard, or of textile fibers, which have been treated with the fluorochemical copolymers of this invention is affected, in part, by the types and amounts of monomers from which the fluorochemical copolymers are derived. For example, use of increased amounts of the monomers of Formula I or Formula II tends to enhance oil and water repellency of the treated paperboard or textile fiber. Use of increased amounts of the monomer of Formula III tends to enhance water repellency, but can detract from oil repellency. Use of increased amounts of the monomer of Formula IV tends to enhance efficient deposition of the fluorochemical copolymer onto cellulosic or textile fibers. Also, this latter monomer aids in emulsifying the fluorochemical copolymer and in stabilizing the emulsion in which the copolymer can be prepared, thereby enhancing the use of reduced levels of other emulsifiers. Vinylidene chloride, if used, tends to enhance water repellency, and serves as a compatible "filler" monomer in the fluorochemical copolymer. Where higher weight percentages of the monomer of Formula II are used, then lesser amounts of vinylidene chloride are required, enabling the amount of vinylidene chloride to be reduced to zero if desired.

Minor, non-interfering amounts of monomers other than those described above can also be incorporated into the fluorochemical copolymers of this invention. For example, the fluorochemical copolymers of this invention can contain up to about 10 weight percent of polymer units derived from ethylene, vinyl acetate, vinyl chloride, vinyl fluoride, vinylidene fluoride, vinyl chloroacetate, acrylonitrile, vinylidene cyanide, styrene, alkyl styrenes, halogenated styrenes, methacrylonitrile, N-vinylcarbazole, vinylpyridine, vinyl alkyl ethers, vinyl alkyl ketones, butadiene, chloroprene, fluoroprene, isoprene, and mixtures thereof. However, the presence of such monomers is not required, and useful fluorochemical copolymers of this invention can consist of or consist essentially of polymer chain repeat units derived from the monomers of Formulae I, II, III, and IV.

Non-interfering amounts of, for example, fluorochemical methacrylates, fluorochemical alkoxyalkylmethacrylates, $C_{18}$ or longer alkyl acrylates or methacrylates, acids such as acrylic acid, methacrylic acid, or chloroacetic acid (most particularly acrylic acid), or hydroxyl containing vinyl monomers (particularly those containing terminal hydroxyl functionality, such as N-methylolacrylamide and 2-hydroxyethyl acrylate) can be incorporated into the copolymers of this invention, but the use thereof preferably is avoided, as their presence in the copolymers of this invention detracts from the oil and water repellency of paperboard or textile fiber treated therewith.

The fluorochemical copolymers of this invention can be prepared using known techniques for emulsion or solution polymerization. Emulsion polymerization is preferred, and can be carried out on a batch or continuous basis in a reaction vessel equipped with a stirrer and external means for heating or cooling the feedstocks and vessel contents. Typically, the reaction vessel will contain about 5 to 50% by weight of the monomers which will be polymerized together, about 35 to 80 percent by weight water, about zero to 30 percent by weight of polar organic solvent(s), and about 0.1 to 10 percent by weight of surface-active agent(s) (i.e., emulsifying agents) capable of stabilizing the resulting emulsion. The reactants are heated to about 40° to 90° C., preferably about 65° to 75° C. Generally about 0.1 to 2 weight percent (based upon the weight of the monomers which will be polymerized together) of a suitable catalyst and about 0.1 to 0.8 weight percent (on the same weight basis) of a suitable chain transfer agent is included in the reaction mixture. At the completion of the reaction, the polar organic solvent preferably is stripped off, e.g., by evaporation. The product is filtered and is then ready for use.

Suitable polar organic solvents include acetone, ethanol, methanol, and other solvents such as those described in U.S. Pat. No. 3,062,765. Acetone is a preferred solvent. Suitable emulsifying agents include cationic surface-active agents such as dodecyltrimethylammonium acetate, octadecylmethyl bis(polyoxyethyl)ammonium chloride, hexadecyltrimethylammonium bromide, trimethyloctadecylammonium chloride, benzyldodecyldimethylammonium chloride, and N-[2-(diethylamino)ethyl]-oleamide hydrochloride. Suitable emulsifying agents also include non-ionic surface-active agents such as the condensation products of ethylene oxide with compounds such as hexylphenol, isooctylphenol, hexadecanol, oleic acid, $C_{12-15}$ alkanethiols and $C_{12-18}$ alkyl amines. Suitable catalyst include 2,2'-azobis-(isobutyramidine)dihydrochloride, potassium persulfate, and other water-soluble catalysts known to those skilled in the art. 2,2'-Azobis(isobutyramidine)dihydrochloride is a preferred catalyst. Suitable chain transfer agents include alkanethiols having 4 to 12 carbon atoms and chain transfer solvents (which can simultaneously function as polar organic solvents during the formation of the fluorochemical copolymer) such as isopropanol. A preferred chain transfer agent is n-octanethiol.

For batch polymerization, lowering the solids content in the reaction vessel will improve the yield of copolymer. Mild agitation of the reactants will tend to increase copolymer yield and decrease the oil and water repellency of paperboard or textile fiber treated with such copolymer. More severe agitation of the reactants will tend to decrease copolymer yield and increase the oil and water repellency of paperboard to textile fiber treated with such copolymer.

Solution polymerization is less preferred than emulsion polymerization. If solution polymerization is employed, the cationic monomer of Formula IV preferably is replaced by a tertiary amine-containing vinyl monomer which is copolymerizable with the other monomers of the reaction mixture. After copolymer formation, the tertiary amino groups of the copolymer are quaternized (e.g., at room temperature) to introduce cationic ammonium groups into the copolymer.

In order to prepare treated paperboard, the fluorochemical copolymers of this invention preferably are applied as internal (i.e., "wet-end") additives to an aqueous suspension of cellulosic fibers, using conventional papermaking equipment. Alum content of the furnish preferably should be kept at low levels, as high alum content can cause the treated paperboard to have reduced oil and water repellency. The fluorochemical copolymer preferably is added or at upstream from the headbox of the papermaking machine, and preferably is added at the headbox. Ordinarily, a polymeric cationic retention aid is added to the stock prior to addition of the fluorochemical copolymer, in order to limit loss of the fluorochemical copolymer into the whitewater. Suitable retention aids include resins such as "Betz 1275" (commercially available from Betz Laboratories, Inc.) or "Reten 304" (commercially available from Hercules, Inc.), both of which are believed to be polymeric cationic aliphatic amides derived from adipic acid and diethylene triamine. Preferably, at least about 80 to 90 percent fluorochemical copolymer retention is obtained at an addition level of about 0.1 to 2 percent retention aid solids based on the weight of fibers. Adjuvants such as dyes, inhibitors, antioxidants, sizing agents, emulsifiers, and the like can be added to the fluorochemical copolymer if desired.

The fluorochemical copolymer is added to the furnish in amounts sufficient to provide the desired level of oil and water repellency. In general, these amounts are between about 0.2 to 2 percent fluorochemical copolymer based on weight of fibers. For reasons of economy, it is preferred to employ a low level of fluorochemical copolymer, coincident with attainment of adequate oil and water repellency in the finished paperboard product. Following addition of the fluorochemical copolymer, the furnish is processed using conventional papermaking technology.

Treated paperboard can also be prepared by applying the fluorochemical copolymers of this invention using wet pick-up methods, such as a size press or calendar stack. If desired, sequential internal and wet pick-up application of the fluorochemical copolymers of this invention can be employed.

Some paperboard made in accordance with this invention attains maximum water repellency after aging (see, e.g., the treated paperboard of Example 2, below). Little or no aging will be required for many other fluorochemical copolymers exemplified below.

Treated paperboard of this invention can be formed into containers (e.g., trays) using conventional techniques (e.g., the "Sprinter", "Kliclok", "Peerless", or molded pulp methods). Because internally-applied fluorochemical copolymers of this invention penetrate uniformly throughout the paper web, aggressive die stamping, folding, or creasing of the treated paperboard will not expose untreated fibers, and the oil and water repellency of the treated paperboard will not be materially lessened by tray-forming operations. Also, if a moisturizing step is used during container-forming, the treated paperboard of this invention will have a more uniform moisture content than moisturized paperboard/polyester laminates, enabling the treated paperboard of this invention to be more readily formed into containers without rupture thereof. In contrast to the use of paperboard/polyester laminates, the treated paperboard of this invention does not tend to stick to the heated steel dies used in press-forming tray manufacturing operations. Both sides of the treated paperboard of this invention readily receive printing ink. In contrast, it is difficult to perform printing operations upon the polyester side of paperboard/polyester laminates. In addition, scrap treated paperboard of this invention which is left over from the container-forming operation can be repulped and reused, unlike scrap from container-forming operations employing paperboard/polyester laminates.

The treated paperboard containers of this invention can be filled with food and stored using conventional techniques. Cooking of food in such containers is also carried out in conventional fashion, but the elevated high temperature oil and water repellency of the paperboard containers of this invention will enable use of high temperatures (e.g., 230° C.), long cooking times (e.g., two hours or more), and cooking of foods (e.g., spinach) which have been prone to cause oil or water staining in paperboard containers heretofore employed.

The fluorochemical copolymers of this invention have also been found to be useful for imparting soil resistance and oil and water repellency to textiles (e.g., polyester carpet fibers). The fibers (or yarn) can be treated as such or in an aggregated form (e.g., skein or roving) with the fluorochemical copolymer, or the fabricated textile (e.g., articles such as carpet and woven fabrics) can be treated with the fluorochemical copolymer. The treatment can be carried out by applying the fluorochemical copolymer by known techniques customarily used in applying fluorochemicals to fibrous substrates. For example, the treatment can be carried out by immersing the fibrous substrate in a bath containing the fluorochemical copolymer, padding the substrate or spraying the same with the fluorochemical copolymer, by using foam, kiss-roll, or metering applications (e.g., spin finishing), or by exhaustion of the copolymer onto the substrate in a dyebath. If desired, the fluorochemical copolymer can be co-applied with adjuvants, e.g., antistatic agents or fiber lubricants.

For textile application dependent on substantial exhaustion of the fluorochemical copolymer from the treating medium, the concentration of copolymer in the exhaustion bath generally will be about 0.001 to 0.1 weight percent. For applications not involving exhaustion, e.g., padding, spraying, etc., higher concentrations will be needed. The amount of fluorochemical copolymer deposited on the treated textile irrespective of the particular mode of application will be, functionally speaking, sufficient to impart the desired degree of oil and water repellency, and generally this amount will be 0.02 to 3, preferably 0.06 to 0.16 weight percent, or, expressed in terms of fluorine content, 0.01 to 1.5, preferably 0.03 to 0.08 weight percent fluorine.

The following examples are offered to aid understanding of the present invention and are not to be construed as limiting the scope thereof.

EXAMPLE 1

Preparation of Copolymer Emulsion

The following ingredients were placed in a screw-capped, 115 ml glass bottle, in the amounts set forth below in Table I:

TABLE I

| Ingredient | Amount, g |
|---|---|
| $C_8F_{17}SO_2N(CH_3)C_2H_4OCOCH=CH_2$ | 21.0 |
| $C_2H_5OC_2H_4OCOCH=CH_2$ | 5.4 |
| $CH_2\underset{\diagdown O \diagup}{\phantom{X}}CHCH_2OCOC(CH_3)=CH_2$ | 1.5 |
| $CH_2=C(CH_3)COOC_2H_4N^+(CH_3)_3Cl^{-(a)}$ | 1.2 |
| n-Octanethiol | 0.06 |
| $C_{18}H_{37}N^+(CH_3)(C_2H_4O)_xH(C_2H_4O)_yH\ Cl^-$, $x+y=15^{(b)}$ | 0.9 |
| 2,2'-Azobis(isobutyramidine) dihydrochloride[c] | 0.15 |
| Deionized water | 52.5 |

TABLE I-continued

| Ingredient | Amount, g |
|---|---|
| Acetone, reagent grade | 17.5 |

[a]"Sipomer Q-6-75", commercially available from Alcolac, Inc.
[b]"Ethoquad 18/25", commercially available from Armak Industrial Chemical Division of Akzona, Inc.
[c]"V50", commercially available from Crescent Chemical Co.

The glass bottle and its contents were briefly subjected to reduced pressure to remove oxygen. The glass bottle was then flushed with oxygen-free nitrogen, sealed, placed in a water bath maintained at 72° C., and tumbled for 16 hours. A 95 percent yield of copolymer was obtained as an aqueous emulsion containing about 30 percent solids.

EXAMPLE 2

Preparation of Fluorochemical Copolymer-treated Paperboard

A 390 gram mixture of bleached sulfate wood pulp containing equal parts of "Alberta HiBrite" softwood pulp and "Marathon" hardwood pulp was placed in a 0.68 kg "Voith" laboratory beater apparatus with 23 liters of water. The resulting mixture was refined for 80 minutes to yield a pulp having a Canadian Standard Freeness of 450 to 500, as measured according to TAPPI Standard No. T227-05-58. The refined wood pulp suspension was then diluted with an equal volume of water to form a suspension containing about 0.8 percent by weight solids. The diluted suspension was stirred with an electric mixer, and 1250 ml of the stirred mixture (containing about 10 g of refined fiber) was removed and placed in a 2 liter graduated cylinder. A 0.15 g portion of cationic polymeric retention aid ("Betz 1275", commercially available from Betz Laboratories Inc.) was mixed with the contents of the graduated cylinder. Next, 0.12 g (0.04 g on a solids basis) of the copolymer of Example 1 was added to the graduated cylinder, followed by mixing. The resulting fiber suspension was poured into a 30.5 cm×30.5 cm paper handsheet mold having an 80 mesh stainless steel screen (commercially available from Williams Apparatus Co.) and containing 10 liters of water. The perforated stirrer was moved up and down 3 times to mix the fiber suspension and water, and the mold then drained. The screen, wet hand-sheet and two paper blotters were pressed using a hand roller. The screen was removed from the sheet, two paper blotters were placed on the wire side of the sheet, and the resulting assembly was squeezed in a hydraulic press at a pressure of 6.9 MPa. The pressed handsheet was dryed in a 46 cm×51 cm sheet dryer (commercially available from Williams Apparatus Co.) that had been set at an initial temperature of 150° C. After insertion of the pressed handsheet, the temperature of the metal dryer plate decreased to about 100° C. The handsheet was removed after the plate temperature recovered to 120° C. A similarly prepared and dried handsheet was cut in half. One half was aged by heating in a forced air oven (commercially available from Despatch Oven Co.) at 120° C. for 15 minutes, and the other half was aged by equilibrating at 22° C., 50% R.H. for 5 days. Next, each of the above-described handsheet samples was cut into 12.7 cm×12.7 cm squares. The square sheets were folded into square trays each having 2.5 cm deep sidewalls and a 7.7 cm×7.7 cm base.

The treated handsheet samples were evaluated for oil repellency by filling two of each of the trays with corn oil ("Mazola", commercially available from Best Foods division of CPC International, Inc.) and placing the filled trays (and enough other filled test trays to bring the total number of filled test trays to 20) on a single oven rack in a preheated 204° C. electric oven for 30 minutes. Such temperatures and times exceed those generally used to evaluate existing fluorochemical oligomer-treated paperboard. The heated trays were removed, emptied, and inspected on the outer surfaces of the sides, base, and corner creases for staining. The oil repellency of the treated handsheets was evaluated visually according to the following scale:

0=staining after tray filled and before tray heated
1=very heavy staining (of sides, bottom and creases)
2=heavy staining (mainly of bottom and creases)
3=moderate staining (mainly of creases)
4=staining of creases only
5=no staining.

The treated handsheet was evaluated for water repellency by filling two each of the treated trays with 1 percent aqueous sodium chloride solution and placing the trays (and enough other filled test trays to bring the total number of filled test trays to 20) in a 204° C. electric oven for 30 minutes. The trays were removed and emptied, and evaluated for staining using the above criteria.

Set out below in Table II are the oil and water repellency ratings obtained for each of the above-described handsheet samples.

TABLE II

| Handsheet sample | Repellency rating Corn oil | Aqueous NaCl |
| --- | --- | --- |
| not aged | 4.5 | 1 |
| aged at 120° C. for 15 min. | 4.5 | 4.5 |
| aged at 22° C., 50% R.H. for 5 days | 4.5 | 4.5 |

The copolymer of Example 1 was used to prepare additional handsheets with dimensions of 30.5 cm × 30.5 cm × 0.58 mm, containing about 30 g refined treated fiber. The handsheets were aged in a forced air oven at 120° C. for 30 minutes, and formed into trays as described above. Various commercial frozen food products containing oily or aqueous fluids were placed in the trays. Two foods were thawed, heated, placed in the trays while hot, and refrozen. The food-filled trays were heated in a conventional oven or in a microwave oven, and the trays then evaluated for staining using the above-described criteria. Set out below in Table III are the food type, tray-filling method, cooking conditions, and repellency ratings obtained.

TABLE III

| Food | Tray filling method[1] | Cooking conditions Oven[2] | Temp. | Time | Repellency rating |
| --- | --- | --- | --- | --- | --- |
| Chili[3] | H | C | 200° C. | 30 min. | 5 |

TABLE III-continued

| Food | Tray filling method[1] | Cooking conditions Oven[2] | Temp. | Time | Repellency rating |
| --- | --- | --- | --- | --- | --- |
| Chili[3] | H | M | —[8] | 7.25 min. | 5 |
| Beef stew[4] | H | C | 200° C. | 30 min. | 5 |
| Beef stew[4] | H | M | —[9] | 9.25 min. | 5 |
| Fish[5] and French Fries[6] | F | C | 200° C. | 30 min. | 5 |
| Fish[5] and French Fries[6] | F | M | —[8] | 7.25 min. | 5 |
| Pancakes and sausages[7] | F | C | 200° C. | 30 min. | 5 |
| Pancakes and sausages[7] | F | M | —[10] | 5 min. | 5 |

[1]"H" = thawed, heated, placed in tray while hot, and re-frozen.
"F" = placed in tray while frozen.
[2]"C" = conventional oven ("Kenmore" model 911.9337910 electric range, commercially available from Sears, Roebuck and Co.).
"M" = microwave oven ("Kenmore" model 747.9957910 1.5 Kw microwave oven, commercially available from Sears, Roebuck and Co.).
[3]"Hormel" chili and beans, commercially available from Geo. A. Hormel & Co.
[4]"Banquet Buffet Supper", commercially available from Banquet Food Corp.
[5]"Gorton's of Gloucester", commercially available from General Mills, Inc.
[6]"Ore-Ida", commercially available from Ore-Ida Foods, Inc.
[7]"Swanson", commercially available from Campbell Soup Co.
[8]5 min. at "3" (Defrost) setting, and 2.25 min. at "10" (High) setting.
[9]5 min. at "3" setting, and 4.25 min. at "10" setting.
[10]5 min. at "10" setting.

This example shows that the fluorochemical copolymers of this invention provide excellent oil and water repellency on paperboard, under both laboratory and actual food cooking conditions.

EXAMPLES 3 TO 32

Using the methods of Examples 1 and 2, several fluorochemical copolymers were prepared, exhausted onto cellulose fiber, made into paperboard, and evaluated. Some of the treated paperboard samples were aged at 22° C. and 50 percent relative humidity for several days, or at 120° C. in a forced air oven for several minutes. Set out below in Table IV are the copolymer charging ingredients and amount in grams of each ingredient for each example. Set out below in Table V are the percent loading of copolymer solids on fiber, amount and type of retention aid, aging time, and oil and water repellency ratings for paperboard treated with the copolymers of Table IV.

These examples show the use of various types and amounts of the monomers of Formulae I, II, III and IV to prepare fluorochemical copolymers of this invention. Also, the use of vinylidene chloride and various emulsifying agents is shown in these examples.

Example 8 is a rerun of Examples 1 and 2. When paperboard treated with the copolymer of Example 8 was aged at 22° C. and 50% R.H. for 2 hours prior to evaluation, a water repellency rating of 1 was obtained. When paperboard treated with the copolymer of Example 8 was aged at 22° C. and 50% R.H. for 5 days prior to evaluation, a water repellency rating of 4 was obtained, indicating that aging of the treated paperboard provided improved water repellency.

TABLE IV

| Copolymer charging ingredients | Example no. and amount in grams | | | | | | | | | | | | | |
| --- | --- | --- | --- | --- | --- | --- | --- | --- | --- | --- | --- | --- | --- | --- |
| | 3 | 4 | 5 | 6 | 7 | 8 | 9 | 10 | 11 | 12 | 13 | 14 | 15 |
| $C_8F_{17}SO_2N(CH_3)C_2H_4OCOCH=CH_2$ | 21.9 | 21.9 | 21.9 | 21.9 | 21.8 | 21 | 67 | 4.44 | 21.9 | 19.5 | 5 | | |
| $C_8F_{17}SO_2N(C_2H_5)C_2H_4OCOCH=CH_2$ | | | | | | | | | | | | 21 | |
| $C_8F_{17}SO_2N(C_4H_9)C_2H_4OCOCH=CH_2$ | | | | | | | | | | | | | 21 |
| $CH_3OCOCH=CH_2$ | 1.8 | | | | | | | | | | | | |
| $C_2H_5OCOCH=CH_2$ | | 1.8 | | | | | | | | | | | |
| $C_4H_9OCOCH=CH_2$ | | | 1.8 | | | | | | | | | | |
| $C_7H_{15}OCOCH=CH_2$ | | | | 1.8 | | | | | | | | | |

TABLE IV-continued

| Copolymer charging ingredients | | | | | | | | | | | | | |
|---|---|---|---|---|---|---|---|---|---|---|---|---|---|
| $C_{14}H_{29}OCOCH=CH_2$ | | | | | 1.65 | | | | | | | | |
| $C_2H_5OC_2H_4OCOCH=CH_2$ | | | | | | 5.4 | 23.6 | 1.1 | 1.8 | 2.5 | 0.56 | 2.7 | 2.7 |
| $\underset{CH_2\ CHCH_2OCOC(CH_3)=CH_2}{\overset{O}{\diagup\!\!\!\diagdown}}$ | 1.5 | 1.5 | 1.5 | 1.5 | 1.5 | 1.5 | 3.9 | 0.31 | 1.5 | 1.7 | 0.31 | 1.7 | 1.7 |
| $CH_2=C(CH_3)COOC_2H_4N^+(CH_3)_3Cl^-$ | 0.6 | 0.6 | 0.6 | 0.6 | 0.6 | 1.2 | 2.5 | 0.19 | 0.6 | 0.9 | 0.19 | 0.7 | 0.7 |
| $CH_2=CCl_2$ | 4.2 | 4.2 | 4.2 | 4.2 | 3.6 | | | | 4.2 | 5.4 | | 3 | 3 |
| $N_2[C(CH_3)_2C(NH_2)=NH.HCl]_2$ | 0.15 | 0.15 | 0.15 | 0.15 | 0.15 | 0.15 | 0.5 | 0.03 | 0.15 | 0.15 | 0.03 | 0.15 | 0.15 |
| $C_{18}H_{37}N^+(CH_3)(C_2H_4O)_xH-(C_2H_4O)_yHCl^-$, $x+y=15$ | 0.9 | 0.9 | 0.9 | 0.9 | 0.9 | 0.9 | 3.0 | 0.19 | 0.9 | 0.9 | 0.19 | 0.9 | 0.9 |
| $n\text{-}C_8H_{17}SH$ | 0.06 | 0.06 | 0.06 | 0.06 | 0.06 | 0.06 | 0.2 | 0.01 | 0.06 | 0.06 | 0.01 | 0.06 | 0.06 |
| Water | 52.5 | 52.5 | 52.5 | 52.5 | 52.5 | 52.5 | 225 | 14 | 52.5 | 52.5 | 14 | 52.5 | 52.5 |
| Acetone | 17.5 | 17.5 | 52.5 | 17.5 | 17.5 | 17.5 | 75 | 4.7 | 17.5 | 17.5 | 4.7 | 17.5 | 17.5 |

| Copolymer charging ingredients | Example no. and amount in grams | | | | | | | | | |
|---|---|---|---|---|---|---|---|---|---|---|
| | 16 | 17 | 18 | 19 | 20 | 21 | 22 | 23 | 24 | 25 |
| $C_8F_{17}SO_2N(CH_3)C_2H_4OCOCH=CH_2$ | | | | | 21.8 | 21 | 21 | 21.8 | 21 | 21.8 |
| $C_6F_{13}SO_2N(C_2H_5)C_2H_4OCOCH=CH_2$ | 4.44 | 5.0 | | | | | | | | |
| $C_6F_{13}SO_2N(C_4H_9)C_2H_4OCOCH=CH_2$ | | | 4.44 | | | | | | | |
| $C_8F_{17}C_2H_4OCOCH=CH_2$ | | | | 21 | | | | | | |
| $CH_3OC_2H_4OCOCH=CH_2$ | | | | | 1.65 | | | | | |
| $CH_3O(CH_2)_4OCOCH=CH_2$ | | | | | | 1.8 | | | | |
| $CH_3O(C_2H_4O)_{15}OCOCH=CH_2$ | | | | | | | 1.8 | | | |
| $C_2H_5OC_2H_4OCOCH=CH_2$ | 1.1 | 0.56 | 1.1 | 2.7 | | | | | | |
| $C_2H_5O(C_2H_4O)_2OCOCH=CH_2$ | | | | | | | | 1.65 | | |
| $C_2H_5O(C_2H_4O)_3OCOCH=CH_2$ | | | | | | | | | 5.4 | |
| $C_4H_9OC_2H_4OCOCH=CH_2$ | | | | | | | | | | 1.65 |
| $\underset{CH_2\ CHCH_2OCOC(CH_3)=CH_2}{\overset{O}{\diagup\!\!\!\diagdown}}$ | 0.31 | 0.31 | 0.31 | 1.7 | 1.5 | 0.9 | 0.9 | 1.5 | 1.5 | 1.5 |
| $CH_2=C(CH_3)COOC_2H_4N^+(CH_3)_3Cl^-$ | 0.19 | 0.19 | 0.19 | 0.7 | 0.6 | 0.6 | 0.6 | 0.9 | 1.2 | 0.6 |
| $CH_2=CCl_2$ | | | | 3 | 3.6 | 5.4 | 5.4 | 3.6 | | 3.6 |
| $N_2[C(CH_3)_2C(NH_2)=NH.HCl]_2$ | 0.03 | 0.03 | 0.03 | 0.15 | 0.15 | 0.15 | 0.15 | 0.15 | 0.15 | 0.15 |
| $C_{18}H_{37}N^+(CH_3)(C_2H_4O)_xH(C_2H_4O)_yHCl^-$, $x+y=15$ | 0.19 | 0.19 | 0.19 | 0.9 | 0.9 | 0.9 | 0.3 | 0.9 | 0.9 | 0.9 |
| $n\text{-}C_8H_{17}SH$ | 0.01 | 0.01 | 0.01 | 0.06 | 0.06 | 0.06 | 0.06 | 0.06 | 0.06 | 0.06 |
| Water | 14 | 14 | 14 | 52.5 | 52.5 | 52.5 | 52.5 | 52.5 | 52.5 | 52.5 |
| Acetone | 4.7 | 4.7 | 4.7 | 17.5 | 17.5 | 17.5 | 17.5 | 17.5 | 17.5 | 17.5 |

| Copolymer charging ingredients | Example no. and amount in grams | | | | | | |
|---|---|---|---|---|---|---|---|
| | 26 | 27 | 28 | 29 | 30 | 31 | 32 |
| $C_8F_{17}SO_2N(CH_3)C_2H_4OCOCH=CH_2$ | 21.4 | 20.8 | 21.8 | 21.8 | 21 | 21 | 21 |
| $C_2H_5OC_2H_4OCOCH=CH_2$ | 1.95 | 1.7 | 1.65 | 1.65 | 2.7 | | |
| $CH_3OCOC(CH_3)=CH_2$ | | | | | | 1.8 | |
| $C_{10}H_{21}OCOC(CH_3)=CH_2$ | | | | | | | 1.8 |
| $\underset{CH_2\ CHCH_2OCOC(CH_3)=CH_2}{\overset{O}{\diagup\!\!\!\diagdown}}$ | 1.35 | 2.4 | 1.5 | 1.5 | 1.7 | 0.9 | 0.9 |
| $CH_2=C(CH_3)COOC_2H_4N^+(CH_3)_3Cl^-$ | 0.3 | 0.8 | | | 0.7 | | |
| $CH_2=C(CH_3)COOC_2H_4N^+(CH_3)_3{}^-OSO_3CH_3$ | | | 1.2 | | | | |
| $CH_2=C(CH_3)COOCH_2CH(OH)CH_2N^+(CH_3)_3Cl^-$ | | | | 0.45 | | 0.6 | 0.6 |
| $CH_2=CCl_2$ | 5 | 4.3 | 3.6 | 3.6 | 3 | 5.4 | 5.4 |
| $N_2[C(CH_3)_2C(NH_2)=NH.HCl]_2$ | 0.15 | 0.15 | 0.15 | 0.15 | 0.15 | 0.15 | 0.15 |
| $C_{18}H_{37}N^+(CH_3)(C_2H_4O)_xH(C_2H_4O)_yHCl^-$, $x+y=15$ | 0.9 | 0.9 | 0.9 | 0.9 | | 0.3 | 0.9 |
| $C_zH_{2z+1}O(C_2H_4O)_{30}H$, $z=11$ to $15$ | | | | | 1.5 | | |
| $n\text{-}C_8H_{17}SH$ | 0.06 | 0.06 | 0.06 | 0.06 | 0.06 | 0.06 | 0.06 |
| Water | 52.5 | 52.5 | 52.5 | 52.5 | 52.5 | 52.5 | 52.5 |
| Acetone | 17.5 | 17.5 | 17.5 | 17.5 | 17.5 | 17.5 | 17.5 |

TABLE V

| | Example No. | | | | | | | | | | | | | | |
|---|---|---|---|---|---|---|---|---|---|---|---|---|---|---|---|
| | 3 | 4 | 5 | 6 | 7 | 8 | 9 | 10 | 11 | 12 | 13 | 14 | 15 | 16 | 17 |
| % Copolymer on fiber | 0.5 | 0.5 | 0.5 | 0.5 | 0.5 | 0.4 | 0.4 | 0.5 | 0.5 | 0.4 | 0.5 | 0.5 | 0.5 | 0.5 | 0.5 |
| Retention aid, % on fiber | | | | | | | | | | | | | | | |
| [a] Polymeric cationic aliphatic amide | 2.0 | 2.0 | 2.0 | 2.0 | 2.0 | 1.5 | 2.0 | 2.0 | 2.0 | 2.0 | 2.0 | 2.0 | 2.0 | 2.0 | 2.0 |
| Aging | | | | | | | | | | | | | | | |
| Days at 22° C., 50% R.H. | 5 | 3 | 5 | 5 | 7 | | 6 | 16 | 5 | 3 | 16 | 7 | 7 | | |
| Minutes at 120° C. | | | | | | 15 | | | | | | | | 16 | 16 |
| Repellency rating | | | | | | | | | | | | | | | |
| Corn oil | 4.3 | 4 | 4.5 | 4.5 | 3 | 4.5 | 4.6 | 5 | 4.5 | 2 | 5 | 4 | 1 | 5 | 5 |
| Aqueous NaCl | 4.5 | 4.6 | 4.8 | 4.6 | 4.8 | 4.8 | 4.1 | 4.9 | 4.8 | 4.4 | 4.4 | 4 | 4 | 4.9 | 4.7 |

TABLE V-continued

| | Example No. | | | | | | | | | | | | | |
|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 |
| % Copolymer on fiber | 0.5 | 0.5 | 0.4 | 0.5 | 0.5 | 0.4 | 0.4 | 0.4 | 0.4 | 0.7 | 0.4 | 0.4 | 0.5 | 0.5 | 0.5 |
| Retention aid, % on fiber | | | | | | | | | | | | | | | |
| [a]Polymeric cationic aliphatic amide | 2.0 | 2.0 | | 1.5 | 1.5 | | 1.5 | | 2.0 | 2.0 | | | 2.0 | 1.5 | 1.5 |
| [b]Polymeric cationic aliphatic amide | | | 1.5 | | | 1.5 | | 1.5 | | | 1.5 | 1.5 | | | |
| Aging | | | | | | | | | | | | | | | |
| Days at 22° C., 50% R.H. | 16 | 7 | 4 | 1 | 3 | 4 | | 4 | 4 | 5 | 4 | 4 | 7 | 1 | 5 |
| Minutes at 120° C. | | | | | | | 15 | | | | | | | | |
| Repellency rating | | | | | | | | | | | | | | | |
| Corn oil | 4.5 | 4.7 | 4.3 | 3 | 4 | 3.5 | 2.5 | 4 | 3.9 | 4.3 | 4 | 4.3 | 4.7 | 3.5 | 4 |
| Aqueous NaCl | 4.8 | 4.8 | 4.3 | 2 | 3.5 | 4 | 4 | | 4.8 | 4.6 | 4.9 | 4.7 | 4.5 | 4.8 | 4.5 | 5 |

[a]"Betz 1275", commercially available from Betz Laboratories, Inc.
[b]"Reten 304", commercially available from Hercules, Inc.

EXAMPLE 33

Fluorochemical copolymers were prepared in a series of five runs labeled "A", "B", "C", "D", and "E". Set out below in Table IV are ingredient numbers, copolymer charging ingredients, and amounts of each ingredient (in grams) used in each of Runs A–E:

TABLE VI

| Ingredient No. | Copolymer charging ingredient | Run, amount in grams | | | | |
|---|---|---|---|---|---|---|
| | | A | B | C | D | E |
| 1 | $C_8F_{17}SO_2N(CH_3)C_2H_4OCOCH=CH_2$ | 277 | 277 | 218 | 327 | 257 |
| 2 | $C_2H_5OC_2H_4OCOCH=CH_2$ | 70.5 | 70.5 | 55 | 83 | 65 |
| 3 |  | 22.5 | 22.5 | 18 | 27 | 21 |
| 4 | $CH_2=C(CH_3)COOC_2H_4N^+(CH_3)_3Cl^-$ | 16 | 16 | 12.4 | 18.6 | 14.6 |
| 5 | $N_2[C(CH_3)_2C(NH_2)=NH.HCl]_2$ | 1.3 | 1.3 | 1.5 | 1.5 | 0.12 |
| 6 | $C_{18}H_{37}N^+(CH_3)(C_2H_4O)_xH$—$(C_2H_4O)_yHCl^-$, $x + y = 15$ | 12 | 12 | 9.3 | 14 | 11 |
| 7 | n-$C_8H_{17}SH$ | 1.1 | 1.1 | 0.86 | 1.32 | 1.03 |
| 8 | water | 764 | 764 | 689 | 1009 | 794 |
| 9 | acetone | 89.5 | 89.5 | | | |

In Run A, ingredient nos. 1 to 4, 6 to 8 and 724 g water were prehomogenized using two passes through a "Manton-Gaulin" Homogenizer operated at 70° C. and 17.2 MPa. The resulting prehomogenized mixture was added to a one liter, three-neck round bottom reaction flask equipped with a condenser, thermometer, and mechanical stirrer. Ingredient no. 5 was added to 40 g water and the resulting mixture was added to the reaction flask. The contents of the flask were stirred for four hours at 80° C., cooled, and filtered to remove a small amount of solid by-product. The filtrate was labelled copolymer emulsion "A".

In Run B, the procedure of Run A was repeated but the mixture of ingredient no. 5 in water was placed in the reaction flask first, the reaction flask contents were stirred at 80° C., and the prehomogenized mixture of the remaining ingredients was held at 70° C. and added gradually to the reaction flask over a 50 minute period. The reaction mixture was stirred for four hours at 80° C., cooled and filtered as in Run A, yielding copolymer emulsion "B".

In Run C, the procedure of Run B was followed but a 613 g portion of water was used in the prehomogenized mixture, ingredient no. 4 was excluded therefrom and the homogenizer was operated at 51.7 MPa. Ingredient no. 4 was dissolved in 36 g water and added to the reaction flask as a separate addition stream during the addition of the prehomogenized mixture. The collected filtrate was labelled copolymer emulsion "C".

In Run D, ingredients nos. 1 to 3, 6 to 8, and 920 g water were heated to 70° C., ingredient no. 4 was added to the heated mixture, and the resulting mixture was prehomogenized using one pass through the homogenizer at 70° C. and 51.7 MPa. Ingredient no. 5 and 89 g water were added to the reaction flask and heated to 80° C. Several hundred grams of the prehomogenized mixture were drawn off from the homogenizer and discarded. A 934 g portion of the prehomogenized mixture was drawn off from the homogenizer and added to the reaction flask over a 15 minute period, and the remainder of the prehomogenized mixture was discarded. The reaction mixture was stirred for four hours at 80° C., cooled, and filtered as in Runs A–C, yielding copolymer emulsion "D".

In Run E, the procedure of Run D was followed but a 724 g portion of water was added to the homogenizer, ingredient no. 5 and 70 g water were added to the reaction flask, and all of the prehomogenized mixture was added to the reaction flask. The collected filtrate was labelled copolymer emulsion "E", and was found to be more stable (as measured using a centrifuge) than copolymer emulsion "D".

The copolymer emulsions of Runs A–E were exhausted onto cellulose fiber, made into paperboard, and evaluated as in Example 2. Set out below in Table VII are the percent loading of copolymer solids on fiber, amount and type of retention aid, aging time, and oil and water repellency ratings (average of two samples) for paperboard treated with the copolymers of Runs A-E. Kit ratings for oil repellency were determined in accordance with TAPPI Useful Method 557.

TABLE VII

| | Run | | | | |
|---|---|---|---|---|---|
| | A | B | C | D | E |
| % Copolymer on fiber | 0.5 | 0.5 | 0.45 | 0.45 | 0.45 |
| Retention aid, % on fiber | | | | | |
| Polymeric cationic aliphatic amide[a] | 1.5 | 1.5 | 1.5 | 1.5 | 1.5 |
| Aging | | | | | |
| Days at 22° C., 50% R.H. | 1 | 1 | 1 | 1 | 1 |
| Repellency rating | | | | | |
| Corn oil | 4.8 | 5 | 4.8 | 5 | 5 |
| Aqueous NaCl | 2.5 | 3 | 5 | 4.8 | 4.8 |
| Kit | 6.5 | 6.5 | 6 | 6.2 | 6.5 |

[a]"Betz 1275"

EXAMPLE 34

To evaluate the utility of a fluorochemical copolymer of this invention as a textile treatment, a loosely knitted fabric of carrierless polyester staple carpet yarn (12 denier per filament) was treated with a padding bath containing 0.68 wt. % of the fluorochemical copolymer of Example 33 Run C, to provide 0.21% solids on fiber. The treated fabric was dried for 15 minutes at 160° C., disperse dyed using a "Launder-Ometer" laboratory dyeing machine (Model LEF, commercially available from the Atlas Electric Devices Company), and dried for 10 minutes at 130° C. The treated fabric was found to have an oil repellency rating of 4 as measured using AATCC Standard Test 118-1978 (modified by waiting 10 seconds instead of 30 seconds before measuring oil repellency). The aqueous stain repellency of the treated fabric was measured using a water/isopropyl alcohol test. In such test, aqueous stain repellency is expressed in terms of the "WATER/IPA" rating of the treated fabric. Treated fabrics which are penetrated by or resistant only to a 100% water/0% isopropyl alcohol mixture, the least penetrating of the test mixtures, are given a rating of 100/0, whereas treated fabrics resistant to a 0% water/100% isopropyl alcohol mixture, the most penetrating of the test mixtures, are given a rating of 0/100. Other intermediate values are determined by use of other water/isopropyl alcohol mixtures, in which the percentage amounts of water and isopropyl alcohol are each multples of 10. The WATER/IPA rating corresponds to the most penetrating mixture which does not penetrate or wet the fabric after 10 seconds contact. In general, a WATER/IPA rating of <50/>50 is desirable. The treated fabric of this example had a WATER/IPA rating of 40/60.

The resistance of the treated fabric to loss of performance during dyeing was evaluated by measuring the fluorine content of the treated fabric before and after dyeing. The treated fabric had 605 ppm fluorine before dyeing and 601 ppm fluorine after dyeing, indicating that nearly 100 percent of the fluorochemical copolymer was retained on the fabric after dyeing.

COMPARATIVE EXAMPLES 1-11

Using the methods of Examples 1 and 2, several fluorochemical copolymers were prepared, exhausted onto cellulose fiber, made into paperboard, and evaluated. Some of the treated paperboard samples were aged at 22° C. and 50 percent relative humidity for several days, or at 120° C. in a forced air oven for several minutes. Set out below in Table VIII are the copolymer charging ingredients and amount in grams of each ingredient for each comparative example. Set out below in Table IX are the percent loading of copolymer solids on fiber, amount and type of retention aid, aging time, and oil and water repellency ratings for paperboard treated with the copolymers of Table VIII.

These Comparative Examples show that paperboard treated with copolymers derived from fluoroaliphatic methacrylates have poorer oil and/or water repellency than paperboard treated with copolymers derived from fluoroaliphatic acrylates (compare, e.g., Comparative Example 1 with Examples 11 and 12, and Comparative Example 2 with Example 19). When n is zero in the monomer of Formula II, use of too large an $R^1$ radical provided poor oil repellency on treated paperboard (see Comparative Examples 3 and 4). Use of hydroxyl-containing monomers resulted in formation of copolymers which provided poor water repellency (and sometimes poor oil repellency) on treated paperboard (see Comparative Examples 5 and 6). When the monomer of Formula III was omitted, the resulting copolymer provided poor water repellency on treated paperboard (see Comparative Example 7). If a copolymer was derived from only 1 weight percent of the monomer of Formula III, paperboard treated therewith had poor water repellency (see Comparative Example 8). When a copolymer was prepared without the monomer of Formula IV, paperboard treated therewith had poor oil repellency (see Comparative Example 9). If no chain transfer agent was employed, or if a large excess of chain transfer agent was employed, the resulting copolymer had too high or too low a molecular weight, respectively, and paperboard treated therewith had no oil or water repellency (see Comparative Examples 10 and 11).

TABLE VIII

| Copolymer charging ingredients | Comparative Example No. and amount in grams | | | | | |
|---|---|---|---|---|---|---|
| | 1 | 2 | 3 | 4 | 5 | 6 |
| $C_8F_{17}SO_2N(CH_3)C_2H_4OCOC(CH_3)=CH_2$ | 21 | | | | | |
| $C_8F_{17}C_2H_4OCOC(CH_3)=CH_2$ | | 21 | | | | |
| $C_8F_{17}SO_2N(CH_3)C_2H_4OCOCH=CH_2$ | | | 21.9 | 21.6 | 21.9 | 21 |
| $C_2H_5OC_2H_4OCOCH=CH_2$ | 2.7 | 5.4 | | | | 1.8 |
| $C_{18}H_{37}OCOCH=CH_2$ | | | 1.8 | | | |
| $C_{18}H_{37}OCOC(CH_3)=CH_2$ | | | | 1.8 | | |
| $HO(CH_2)_4OCOCH=CH_2$ | | | | | 1.8 | |
| $HOCH_2NHCOCH=CH_2$ | | | | | | 0.9 |
| 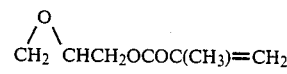 | 1.7 | 1.5 | 1.5 | 1.5 | 1.5 | |
| $CH_2=C(CH_3)COOC_2H_4N^+(CH_3)_3Cl^-$ | 0.7 | 1.2 | 0.6 | 0.6 | 0.6 | 0.6 |
| $CH_2=CCl_2$ | 3 | | 4.2 | 3.6 | 4.2 | 5.4 |

TABLE VIII-continued

| | | | | | | |
|---|---|---|---|---|---|---|
| N$_2$[C(CH$_3$)$_2$C(NH$_2$)=NH.HCl]$_2$ | 0.15 | 0.15 | 0.15 | 0.15 | 0.15 | 0.15 |
| C$_{18}$H$_{37}$N$^+$(CH$_3$)(C$_2$H$_4$O)$_x$H(C$_2$H$_4$O)$_y$HCl$^-$ x + y = 15 | 0.9 | 0.9 | 0.9 | 0.9 | 0.9 | 0.9 |
| n-C$_8$H$_{17}$SH | 0.06 | 0.06 | 0.06 | 0.06 | 0.06 | 0.06 |
| water | 52.5 | 52.5 | 52.5 | 52.5 | 52.5 | 52.5 |
| acetone | 17.5 | 17.5 | 17.5 | 17.5 | 17.5 | 17.5 |

| Copolymer charging ingredients | Comparative Example No. and amount in grams | | | | |
|---|---|---|---|---|---|
| | 7 | 8 | 9 | 10 | 11 |
| C$_8$F$_{17}$SO$_2$N(CH$_3$)C$_2$H$_4$OCOCH=CH$_2$ | 22.5 | 21.7 | 22.5 | 21 | 21 |
| C$_2$H$_5$OC$_2$H$_4$OCOCH=CH$_2$ | 2.1 | 1.95 | 2.1 | 5.4 | 5.4 |
| CH$_2$—CHCH$_2$OCOC(CH$_3$)=CH$_2$ (epoxy) | | 0.3 | 0.9 | 1.5 | 1.5 |
| CH$_2$=C(CH$_3$)COOC$_2$H$_4$N$^+$(CH$_3$)$_3$Cl$^-$ | 0.6 | 0.9 | | 1.2 | 1.2 |
| CH$_2$=CCl$_2$ | 3.9 | 5.2 | 3.6 | | |
| N$_2$[C(CH$_3$)$_2$C(NH$_2$)=NH.HCl]$_2$ | 0.15 | 0.15 | 0.15 | 0.15 | 0.15 |
| C$_{18}$H$_{37}$N$^+$(CH$_3$)(C$_2$H$_4$O)$_x$H(C$_2$H$_4$O)$_y$HCl$^-$ x + y = 15 | 0.9 | 0.9 | 0.9 | 0.9 | 0.9 |
| n-C$_8$H$_{17}$SH | 0.06 | 0.06 | 0.06 | | 0.3 |
| water | 52.5 | 52.5 | 52.5 | 52.5 | 52.5 |
| acetone | 17.5 | 17.5 | 17.5 | 17.5 | 17.5 |

TABLE IX

| | Comparative Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| % Copolymer on fiber | 0.5 | 0.4 | 0.5 | 0.4 | 0.5 | 0.5 | 0.4 | 0.4 | 0.4 | 0.4 | 0.4 |
| Retention aid, % on fiber | | | | | | | | | | | |
| [a]Polymeric cationic aliphatic amide | 2.0 | 1.5 | 2.0 | 2.0 | 2.0 | 1.5 | 2.5 | 2.0 | 1.5 | 1.5 | 1.5 |
| Aging | | | | | | | | | | | |
| Days at 22° C., 50% R.H. | 7 | | 5 | 3 | 5 | 3 | 2 | 5 | 1 | | |
| Minutes at 120° C. | | 15 | | | | | | | | 15 | 15 |
| Repellency rating | | | | | | | | | | | |
| Corn oil | 0 | 1 | 1 | 1.5 | 1.3 | 4.5 | 4.3 | 4 | 1 | 0 | 0 |
| Aqueous NaCl | 0 | 4.8 | 4.5 | 5 | 1.7 | 1 | 1 | 1 | 2.3 | 0 | 0 |

[a]"Betz 1275"

Various modifications and alterations of this invention will be apparent to those skilled in the art without departing from the scope and spirit of this invention and the latter should not be restricted to that set forth herein for illustrative purposes.

What is claimed is:

1. Fluorochemical copolymers useful for imparting oil and water repellency under food cooking conditions to cellulosic materials, or oil and water repellency to textile fibers, said copolymers comprising (by weight) about:

(a) 60 to 80% of polymer chain repeat units derived from fluoroacrylate monomer of the formula:

$$(R_f)_pQOCOCH=CH_2$$

wherein $R_f$ is a fluoroaliphatic radical-containing group having 3 to 20 carbon atoms, Q is a polyvalent organic connecting group, and p is 1 or 2;

(b) 1 to 30% of polymer chain repeat units derived from alkyl or alkoxyalkyl acrylate or methacrylate monomer of the formula:

$$R^1O(R^2O)_n[C(O)CH_2O]_mCOCR^3=CH_2$$

wherein $R^1$ is a C$_{1-20}$ alkyl or cycloalkyl group, $R^2$ is a C$_{1-6}$ alkylene group, each $R^2$ group can be the same as or different from other $R^2$ groups, n is zero to about 10 with the proviso that when n is zero $R^1$ is a C$_{1-16}$ alkyl or cycloalkyl group, m is zero or 1, and $R^3$ is H or methyl;

(c) 2 to 15% of polymer chain repeat units derived from monomer of the formula:

$$CH_2\text{—}CHCH_2OCOC(R^4)=CH_2 \text{ (epoxy)}$$

wherein $R^4$ is H or methyl;

(d) 1 to 6% of polymer chain repeat units derived from cationic monomer of the formula:

$$CH_2=C(R^5)ZY^+X^-$$

wherein $R^5$ is H or methyl, Z is a divalent electron-withdrawing group which activates free-radical polymerization, $Y^+$ is a monovalent cationogenic group, and $X^-$ is a water solubilizing anion; and (e) 0 to 20% of polymer chain repeat units derived from vinylidene chloride; with the proviso that the weight percent of carbon-bonded fluorine in said copolymers is at least about 15%.

2. Fluorochemical copolymers according to claim 1, wherein Q is —CH$_2$—, —C$_2$H$_4$—, or —SO$_2$N(R$^6$)C$_2$H$_4$—, where $R^6$ is H or a C$_{1-4}$ alkyl radical.

3. Fluorochemical copolymers according to claim 1, wherein n is zero.

4. Fluorochemical copolymers according to claim 1, wherein n is 1 and m is zero.

5. Fluorochemical copolymers according to claim 1, wherein $R^1$ is a C$_{1-4}$ alkyl radical and $R^2$ is a C$_{1-4}$ alkylene radical.

6. Fluorochemical copolymers according to claim 1, wherein $R^1$ is $CH_3CH_2-$, $R^2$ is $-C_2H_4-$, n is 1, m is zero, and $R^3$ is H.

7. Fluorochemical copolymers, comprising (by weight) about:
(a) 65 to 75% of polymer chain repeat units derived from $C_8F_{17}SO_2N(CH_3)C_2H_4OCOCH=CH_2$;
(b) 10 to 20% of polymer chain repeat units derived from $CH_3CH_2OC_2H_4OCOCH=CH_2$;
(c) 3 to 10% of polymer chain repeat units derived from

(d) 2 to 4% of polymer chain repeat units derived from $CH_2=C(CH_3)COOC_2H_4N^+(CH_3)_3Cl^-$; and
(e) 0.1 to 0.8% of chain transfer agent.

8. Textile fibers, having incorporated thereon fluorochemical copolymer according to claim 1.

9. Textile fibers, having incorporated thereon fluorochemical copolymer according to claim 6.

10. A process for imparting high temperature oil and water repellency and food stain resistance to cellulosic material, comprising the step of applying to said material at least one fluorochemical copolymer comprising (by weight) about:
(a) 60 to 80% of polymer chain repeat units derived from fluoroacrylate monomer of the formula:

wherein $R_f$ is a fluoroaliphatic radical-containing group having 3 to 20 carbon atoms, Q is a polyvalent organic connecting group, and p is 1 or 2;
(b) 1 to 30% of polymer chain repeat units derived from alkyl or alkoxyalkyl acrylate or methacrylate monomer of the formula:

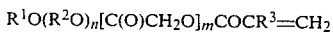

wherein $R^1$ is a $C_{1-20}$ alkyl or cycloalkyl group, $R^2$ is a $C_{1-6}$ alkylene group, each $R^2$ can be the same as or different from other $R^2$ groups, n is zero to about 10 with the proviso that when n is zero $R^1$ is a $C_{1-16}$ alkyl or cycloalkyl group, m is zero or 1, and $R^3$ is H or methyl;
(c) 2 to 15% of polymer chain repeat units derived from monomer of the formula:

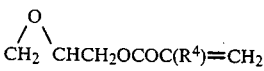

wherein $R^4$ is H or methyl;
(d) 1 to 6% of polymer chain repeat units derived from cationic monomer of the formula:

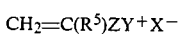

wherein $R^5$ is H or methyl, Z is a divalent electron-withdrawing group which activates free-radical polymerization, $Y^+$ is monovalent cationogenic group, and $X^-$ is a water solubilizing anion; and
(e) 0 to 20% of polymer chain repeat units derived from vinylidene chloride; with the proviso that the weight percent of carbon-bonded fluorine in said copolymer is at least about 15%.

11. A process according to claim 10, wherein $R^1$ is $CH_3CH_2-$, $R^2$ is $-C_2H_4-$, n is 1, m is zero, and $R^3$ is H.

12. A process according to claim 10, wherein said fluorochemical copolymer comprises (by weight) about:
(a) 65 to 75% of polymer chain repeat units derived from $C_8F_{17}SO_2N(CH_3)C_2H_4OCOCH=CH_2$;
(b) 10 to 20% of polymer chain repeat units derived from $CH_3CH_2OC_2H_4OCOCH=CH_2$;
(c) 3 to 10% of polymer chain repeat units derived from

(d) 2 to 4% of polymer chain repeat units derived from $CH_2=C(CH_3)COOC_2H_4N^+(CH_3)_3Cl^-$; and
(e) 0.1 to 0.8% of chain transfer agent.

13. A process for imparting oil and water repellency to textile fibers, comprising the step of applying to said fibers at least one fluorochemical copolymer comprising (by weight) about:
(a) 60 to 80% of polymer chain repeat units derived from fluoroacrylate monomer of the formula:

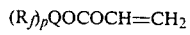

wherein $R_f$ is a fluoroaliphatic radical-containing group having 3 to 20 carbon atoms, Q is a polyvalent organic connecting group, and p is 1 or 2;
(b) 1 to 30% of polymer chain repeat units derived from alkyl or alkoxyalkyl acrylate or methacrylate monomer of the formula:

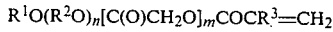

wherein $R^1$ is a $C_{1-20}$ alkyl or cycloalkyl group, $R^2$ is a $C_{1-16}$ alkylene group, each $R^2$ group can be the same as or different from other $R^2$ groups, n is zero to about 10 with the proviso that when n is zero $R^1$ is a $C_{1-16}$ alkyl or cycloalkyl group, m is zero or 1, and $R^3$ is H or methyl;
(c) 2 to 15% of polymer chain repeat units derived from monomer of the formula:

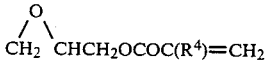

wherein $R^4$ is H or methyl;
(d) 1 to 6% of polymer chain repeat units derived from cationic monomer of the formula:

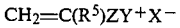

wherein $R^5$ is H or methyl, Z is a divalent electron-withdrawing group which activates free-radical polymerization, $Y^+$ is a monovalent cationogenic group, and $X^-$ is a water solubilizing anion; and
(e) 0 to 20% of polymer chain repeat units derived from vinylidene chloride; with the proviso that the weight percent of carbon-bonded fluorine in said copolymers is at least about 15%.

14. A process according to claim 13, wherein said fibers comprise polyester carpet fibers.

* * * * *

UNITED STATES PATENT AND TRADEMARK OFFICE
CERTIFICATE OF CORRECTION

PATENT NO. : 4,579,924

DATED : April 1, 1986

INVENTOR(S) : Craig A. Schwartz and Michael M. Lynn

It is certified that error appears in the above-identified patent and that said Letters Patent is hereby corrected as shown below:

Col. 1, line 67 (Page 2, line 25), "former" should read
--formed--.

Cols. 13 and 14, Table V (page 25, line 11), the table should indicate that the compositions of Example Nos. 16 and 17 were aged for 16 days at $22^{\circ}C.$, 50% R.H.

Signed and Sealed this

Fifth Day of August 1986

[SEAL]

Attest:

DONALD J. QUIGG

Attesting Officer

Commissioner of Patents and Trademarks